(12) United States Patent
Murakami et al.

(10) Patent No.: US 11,507,536 B2
(45) Date of Patent: Nov. 22, 2022

(54) INFORMATION PROCESSING APPARATUS AND NON-TRANSITORY COMPUTER READABLE MEDIUM FOR SELECTING FILE TO BE DISPLAYED

(71) Applicant: FUJIFILM BUSINESS INNOVATION CORP., Tokyo (JP)

(72) Inventors: Junko Murakami, Kanagawa (JP); Yasuhiro Ito, Kanagawa (JP); Tomoyuki Shimizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 149 days.

(21) Appl. No.: 17/011,245

(22) Filed: Sep. 3, 2020

(65) Prior Publication Data

US 2021/0216503 A1 Jul. 15, 2021

(30) Foreign Application Priority Data

Jan. 15, 2020 (JP) .............................. JP2020-004300

(51) Int. Cl.
| | | |
|---|---|---|
| *G06F 16/16* | (2019.01) | |
| *G06F 16/14* | (2019.01) | |
| *G06F 16/188* | (2019.01) | |
| *G06F 16/176* | (2019.01) | |
| *G06F 3/04812* | (2022.01) | |

(52) U.S. Cl.
CPC ........ *G06F 16/168* (2019.01); *G06F 3/04812* (2013.01); *G06F 16/148* (2019.01); *G06F 16/176* (2019.01); *G06F 16/192* (2019.01)

(58) Field of Classification Search
CPC .... G06F 16/148; G06F 16/168; G06F 16/176; G06F 16/192; G06F 3/0482; G06F 3/04812; G06F 16/16; G06F 16/166
USPC ......................................................... 707/828
See application file for complete search history.

(56) References Cited

U.S. PATENT DOCUMENTS

| 8,712,862 | B2* | 4/2014 | Gokturk | .............. G06F 16/5838 |
| | | | | 705/26.1 |
| 2011/0161388 | A1* | 6/2011 | Inose | .................... G06F 16/166 |
| | | | | 707/827 |
| 2014/0365430 | A1* | 12/2014 | Funayama | .............. G06F 16/16 |
| | | | | 707/609 |
| 2019/0087416 | A1* | 3/2019 | Ito | ......................... G06F 40/169 |

FOREIGN PATENT DOCUMENTS

| JP | 2007-025998 A | 2/2007 |
| JP | 4501731 B2 | 7/2010 |

* cited by examiner

*Primary Examiner* — Shahid A Alam

(74) *Attorney, Agent, or Firm* — Oliff PLC

(57) ABSTRACT

An information processing apparatus is able to access a file storage region which is formed in accordance with job defining information that defines tasks of a job and a file to be created in each of the tasks. The file storage region is formed for each job or each job and each task. A file related to a job or a task is stored in a corresponding file storage region. The information processing apparatus includes a processor which is configured to: obtain job status information concerning a status of each job for which a file storage region is formed; and select, a display element indicating files stored in a first file storage region, a file as a subject file to be displayed, from among the files stored in the first file storage region, in accordance with the status of a first job corresponding to the first file storage region.

12 Claims, 17 Drawing Sheets

FIG. 2

| JOB CASE 1 | JOB CASE No. | JOB CASE 1 | | |
|---|---|---|---|---|
| | TEMPLATE No. | T001 | | |
| | USER | userA、userB、・・・ | | |
| | FOLDER NAME | JOB CASE 1 | | |
| | PROGRESS | COMPLETED OR ONGOING STEP No. | | |
| | DOCUMENT | STEP 1 | DOCUMENT NAME | DOCUMENT 1-1 |
| | | | CREATOR | userA |
| | | | CREATED (YES/NO) | YES |
| | | | APPROVER | userB |
| | | | APPROVED (YES/NO) | YES |
| | | | DOCUMENT NAME | DOCUMENT 1-2 |
| | | | CREATOR | userA |
| | | | CREATED (YES/NO) | YES |
| | | | APPROVER | userB |
| | | | APPROVED (YES/NO) | YES |
| | | STEP 2 | DOCUMENT NAME | DOCUMENT 2-1 |
| | | | CREATOR | userB |
| | | | ・・・ | |
| | | STEP 3 | ・・・ | ・・・ |
| | | ・・・ | | |
| JOB CASE 2 | JOB CASE No. | JOB CASE 2 | | |
| | TEMPLATE No. | T001 | | |
| | ・・・ | ・・・ | | |
| JOB CASE 3 | ・・・ | ・・・ | | |
| ・・・ | | | | |

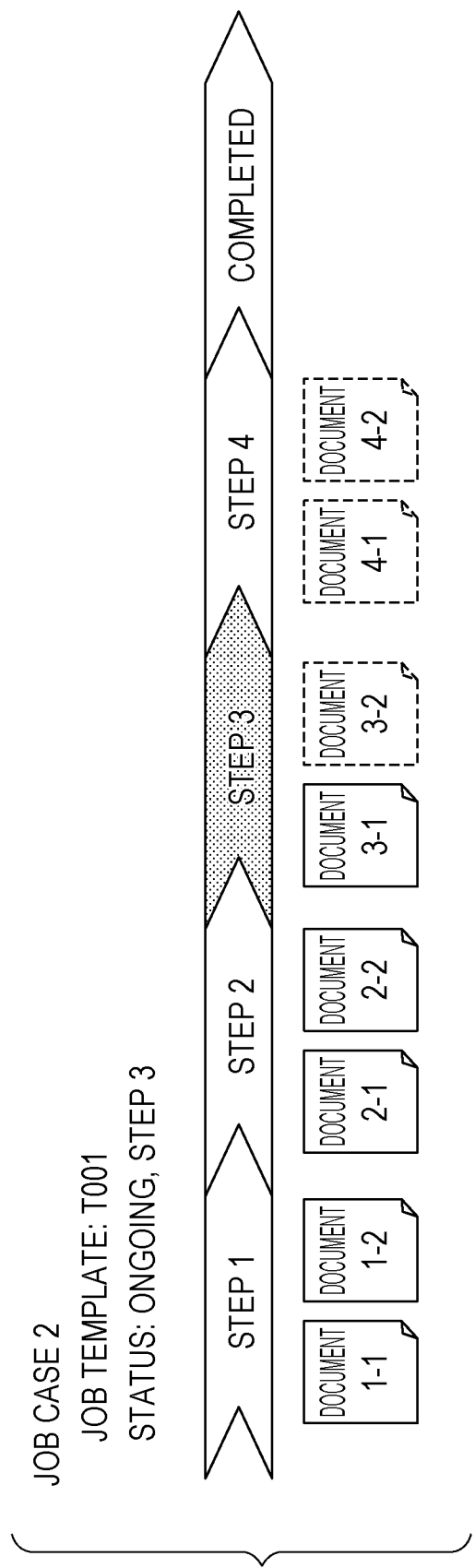

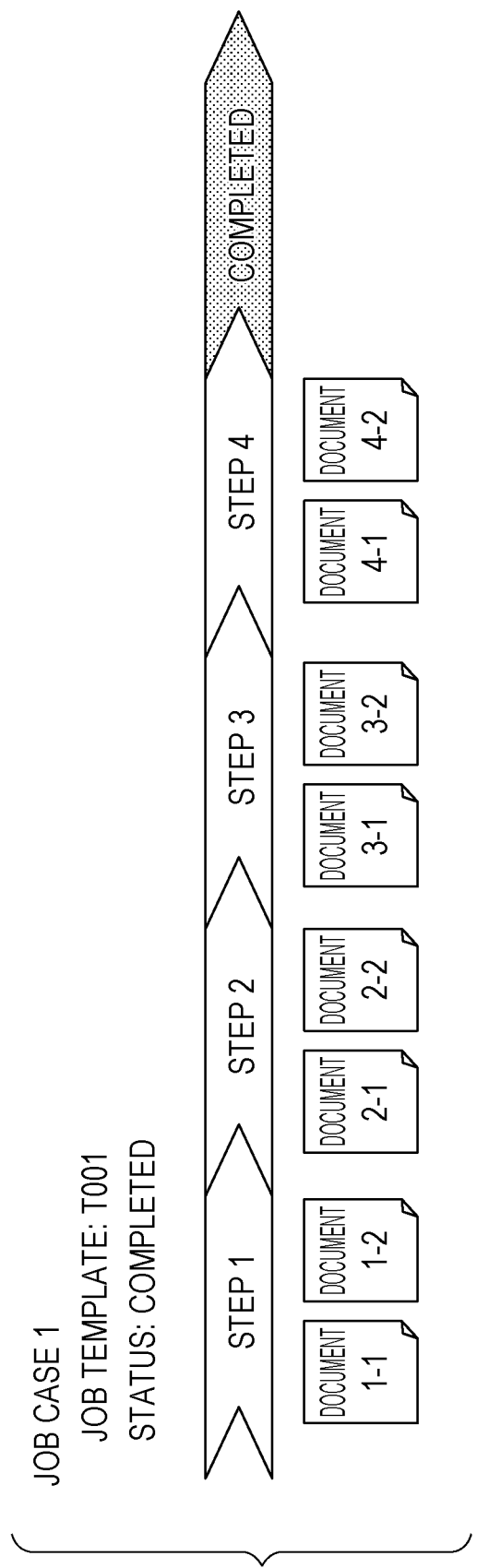

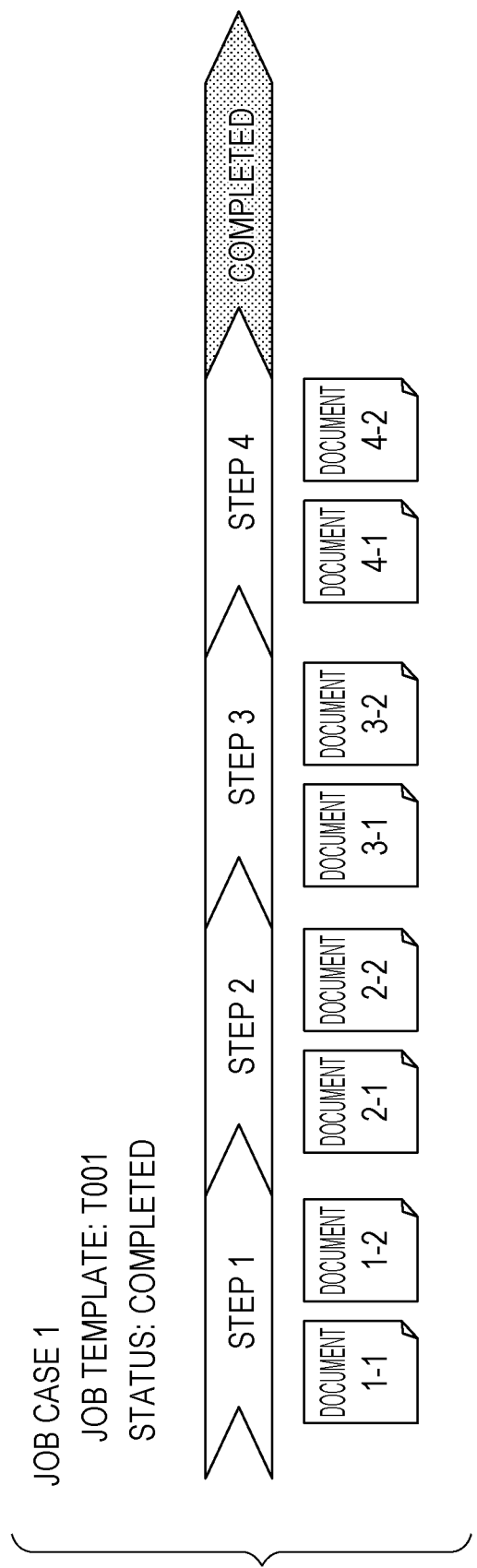

INFORMATION PROCESSING APPARATUS AND NON-TRANSITORY COMPUTER READABLE MEDIUM FOR SELECTING FILE TO BE DISPLAYED

CROSS-REFERENCE TO RELATED APPLICATIONS

This application is based on and claims priority under 35 USC 119 from Japanese Patent Application No. 2020-004300 filed Jan. 15, 2020.

BACKGROUND

(i) Technical Field

The present disclosure relates to an information processing apparatus and a non-transitory computer readable medium.

(ii) Related Art

Typically, job document management is performed as follows. A folder is created for each job and documents are stored in the corresponding folders. Sometimes, multiple folders are created for each job in a hierarchical structure and documents are stored in the corresponding folders, thereby sorting the documents in greater detail.

When carrying out a job, a user often checks past documents. In this case, however, the user may not always remember in which folders the past documents are stored. The user then opens folders which are likely to include the past documents, downloads certain documents and checks the content, or uses a search function to find the past documents.

As an example of the related art, the following technology has been proposed. In response to a user selecting a folder with a mouseover operation, such as the user setting a pointer over the folder with a mouse, four image files that are first found are displayed in a tooltip window as the representative image files included in this folder (see, Japanese Unexamined Patent Application Publication No. 2007-025998, for example).

Another example of the related art is disclosed in Japanese Patent No. 4501731.

SUMMARY

In the related art, however, files to be displayed in response to an operation for displaying files, such as a mouseover operation, are fixed. For example, in the above-described technology, the first four image files are always displayed. Files to be displayed are not changed in accordance with the status of a job.

Aspects of non-limiting embodiments of the present disclosure relate to an information processing apparatus and a non-transitory computer readable medium in which, in response to an operation for displaying a display element indicating files stored in a file storage region created for a job, files to be displayed are selected from among the files stored in the file storage region in accordance with the status of the job.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus which is able to access a file storage region. The file storage region is formed in accordance with job defining information that defines tasks of a job and a file to be created in each of the tasks. The file storage region is formed for each job or each job and each task. A file related to a job or a task is stored in a corresponding file storage region. The information processing apparatus includes a processor. The processor is configured to: obtain job status information concerning a status of each job for which a file storage region is formed; and select, in response to an operation for displaying a display element indicating files stored in a first file storage region, a file as a subject file to be displayed, from among the files stored in the first file storage region, in accordance with the status of a first job corresponding to the first file storage region, the status of the first job being obtained from the job status information.

BRIEF DESCRIPTION OF THE DRAWINGS

Exemplary embodiments of the present disclosure will be described in detail based on the following figures, wherein:

FIG. 2 illustrates an example of the data structure of job management information in the first exemplary embodiment;

FIG. 3C schematically illustrates the status of job case 2 in the first exemplary embodiment;

FIG. 6A schematically illustrates the status of job case 1 in a second exemplary embodiment;

FIG. 7A schematically illustrates the status of job case 1 in a third exemplary embodiment;

DETAILED DESCRIPTION

Exemplary embodiments of the disclosure will be described below with reference to the accompanying drawings.

First Exemplary Embodiment

Figure 1:
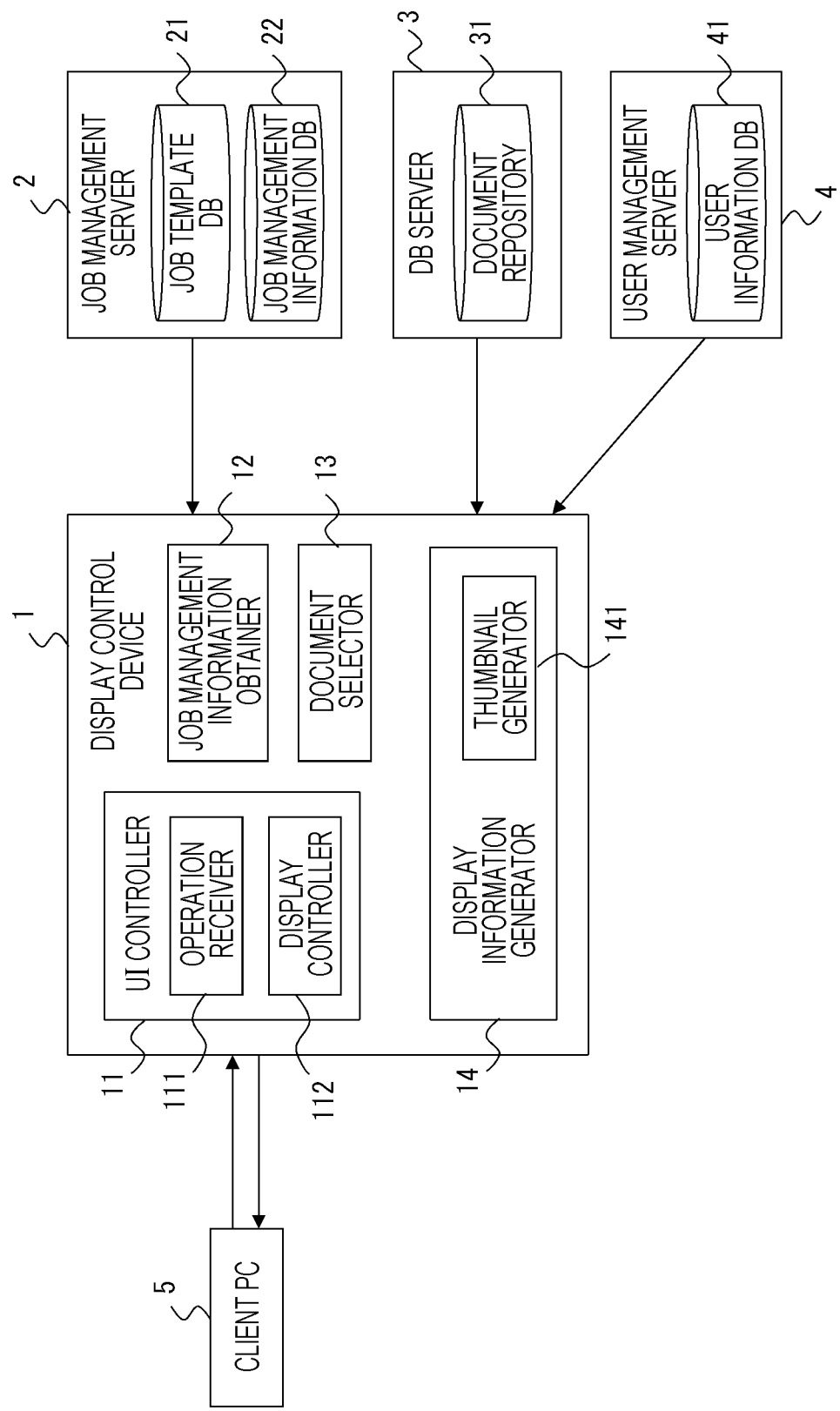
FIG. 1 is a schematic block diagram illustrating a file management system according to a first exemplary embodiment.

FIG. 1 is a schematic block diagram illustrating a file management system according to a first exemplary embodiment. FIG. 1 includes a display control device 1, a job management server 2, a database (DB) server 3, a user management server 4, and a client personal computer (PC) 5. Each of the display control device 1, the job management server 2, the DB server 3, and the user management server 4 is a system for providing services concerning files, such as documents, to a user using the client PC 5. The first exemplary embodiment will be explained, assuming that documents created in certain jobs are handled as files. The file management system in the first exemplary embodiment is implemented by cloud computing, for example. However, the file management system may be implemented in the configuration other than that by cloud computing, in accordance with the scale or the usage situation of the file management system. For example, a single server may serve as the display control device 1, the job management server 2, the DB server 3, and the user management server 4.

The client PC 5 is implemented by the hardware configuration of a general-purpose PC including a central processing unit (CPU), a read only memory (ROM), a random access memory (RAM), a storage, a communication interface, and a user interface. The client PC 5 refers to a file (document) managed by the DB server 3 via the display control device 1. In the first exemplary embodiment, a mouse is used as a user input interface.

Each of the job management server 2, the DB server 3, and the user management server 4 may be implemented by the hardware configuration of a general-purpose server computer. That is, the job management server 2, the DB server 3, and the user management server 4 may each include a CPU, a ROM, a RAM, a storage, such as a hard disk drive (HDD), and a communication interface. They may also include a user interface for allowing an administrator, for example, to manage information.

The job management server 2 is a server computer that manages information concerning jobs. The job management server 2 includes a job template DB 21 and a job management information DB 22. A job template is job defining information that defines tasks of a job and types of files to be created in each task of a job. It is not always necessary to determine the order in which tasks of a job are executed. The first exemplary embodiment will be explained, however, assuming that tasks of a job are executed in chronological order. In the following description, "steps", which form a procedure of tasks, will be used as tasks. A job case, which is used for carrying out a job, is drafted after a job template for this job case is determined. Then, steps to be executed in this job case, the order of the steps (that is, a job process), and the types of files to be created are determined. A job case describes the specific content of a job based on a job template selected for this job. The first exemplary embodiment will be discussed, assuming that digital document data (hereinafter simply called a document) is created as a file. Additionally, in the first exemplary embodiment, a folder, which is a storage region for a document, is created for each job case and for each step. A document created in accordance with the progress of a step is stored in a corresponding folder. In the first exemplary embodiment, as shown in FIG. 3B, for example, a folder is created for a job case of a certain job (such a folder may also be called a parent folder), and then, folders for individual steps of this job case are created under the parent folder (such folders may also be called child folders). However, folders for individual steps, that is, child folders, may not necessarily be created, and all documents created for a job case may be stored in a parent folder for this job case. Under a child folder, another folder may be created, and under this folder, another folder may be created. In this manner, documents may be managed in a hierarchical structure having more levels than those in FIG. 3B.

FIG. 2 illustrates an example of the data structure of job management information in the first exemplary embodiment. The status of a job in each drafted job case is managed by job management information. The individual items of information shown in FIG. 2 will be explained. "Job case No." is identification information concerning a job case. "Template No." is identification information concerning a template used for this job case. "User" is identification information concerning one or more users engaged in this job case. "Folder name" is the name of the folder positioned on the highest level of the hierarchical structure (that is, the parent folder) of this job case. "Progress" indicates the progress status of this job case. If the job of this job case has been completed, "Completed" is set in "Progress", and if it has not been completed and is currently in progress, the ongoing step number is set in "Progress". In "Document", documents to be created in this job case are managed for each step. In each step, "Document name", "Creator", and "Approver" are set for each document. "Created" is information indicating the status of the document, that is, information indicating whether the corresponding document has been created. "Approved" is information indicating the status of the document, that is, information indicating whether the corresponding document has been approved. If the document has been created or approved, "Yes" is set, and if the document has not been created or approved, "No" is set.

The items of information shown in FIG. 2 are those referred to in the first exemplary embodiment, and the job management information may include other items of information. The job management information is suitably updated in accordance with the status of the job. In FIG. 1, elements for executing information management, such as setting and updating of information, and provision of information are not shown in the job management server 2. Likewise, not all the elements of the DB server 3 and the user management server 4 are shown in FIG. 1.

The DB server 3 includes a document repository 31 that stores documents handled in the first exemplary embodiment. As discussed above, a document handled in the first exemplary embodiment is stored in a folder provided for each job case or each step in the document repository 31.

The user management server 4 includes a user information DB 41 for storing user information concerning users engaged in individual job cases. The user information includes identification information and affiliation information concerning each user, such as the department of each user.

The display control device 1 refers to information managed by the job management server 2, the DB server 3, and the user management server 4 and provides documents to the client PC 5. As well as the job management server 2, the DB server 3, and the user management server 4, the display control device 1 may be implemented by the hardware configuration of a general-purpose server computer or PC. That is, the display control device 1 includes a CPU, a ROM, a RAM, a storage, such as an HDD, and a communication interface. The display control device 1 may include a user interface for executing information management, for example.

The display control device 1 includes a user interface (UI) controller 11, a job management information obtainer 12, a document selector 13, and a display information generator 14. Elements that are not referred to in the first exemplary embodiment are not shown in FIG. 1. The UI controller 11 includes an operation receiver 111 and a display controller 112. The operation receiver 111 receives an operation performed by a user on the client PC. The display controller 112 performs control to display documents on the client PC 5. The job management information obtainer 12 obtains job management information from the job management server 2. The job management information obtained by the job management information obtainer 12 is job status information concerning the status of a job (job case). The document selector 13 selects documents to be displayed on the screen of the client PC 5 when the user of the client PC 5 has selected a folder with a mouseover operation, such as when the user has set a mouse pointer over a folder displayed on the screen of the client PC 5 with a mouse. The display information generator 14 generates display information including thumbnails of the selected documents. The display controller 112 performs control to display the display information generated by the display information generator 14 on the screen of the client PC 5.

The UI controller 11, the job management information obtainer 12, the document selector 13, and the display information generator 14 are implemented by collaborative work between a computer forming the display control device 1 and a program executed by the CPU of the computer.

Programs to be used in the first exemplary embodiment may be provided by a communication medium or as a result of being stored in a computer-readable recording medium, such as a compact disc (CD)-ROM or a universal serial bus (USB) memory. The programs provided by a communication medium or via a recording medium are installed into the computer, and various processing operations described by the programs are implemented as a result of the CPU of the computer sequentially executing the programs.

The operation in the first exemplary embodiment will be described below.

When a job template is selected and a job case is drafted, folders for storing documents to be generated in this job case are created in the document repository 31. Documents created in individual steps forming this job case are stored in the corresponding folders in the document repository 31.

When the user of the client PC 5 is trying to create a document in an ongoing step of an ongoing job case, it may wish to check a past document. More specifically, the user may be trying to create a document by checking a past document highly related to the document to be created. In this case, by relying on the user's memory, the user searches for a target document by using a search function. The names of documents created for job cases which are drafted based on the same job template are likely to be similar to each other. For this reason, the user may be required to open and check the documents one by one. It thus takes a lot of time and effort for the user to find the target document. Even if the user has succeeded in finding the folder storing the target document, many documents may be stored in this folder. If it is not possible to display all the thumbnail document images on the screen, the user has to search for the target document by scrolling up and down the screen.

In the first exemplary embodiment, when a user performs an operation for displaying a display element (that is, thumbnails) indicating documents stored in a folder, such as when the user selects one of the folders displayed on the screen with a mouseover operation, documents which are likely to be checked by the user among the documents stored in the selected folder are selected as the subject documents to be displayed in accordance with the status of a job (job case) or a task (step) corresponding to this folder. Then, thumbnails of the selected documents are displayed. That is, when a certain folder is selected with a mouse, instead of displaying all the documents stored in this folder, documents are selectively displayed in accordance with the status of a job case or a step. In other words, when a user selects a certain folder with a mouseover operation, the documents to be displayed among the documents in this folder are not always the same and are varied in accordance with the status of a job case or a step. This enables the user to easily find a target document and also reduces the display space of document thumbnails.

Before explaining the above-described distinctive processing of the first exemplary embodiment, examples of the status of a job case where the processing of the first exemplary embodiment is executed will be described below.

Figure 3A:
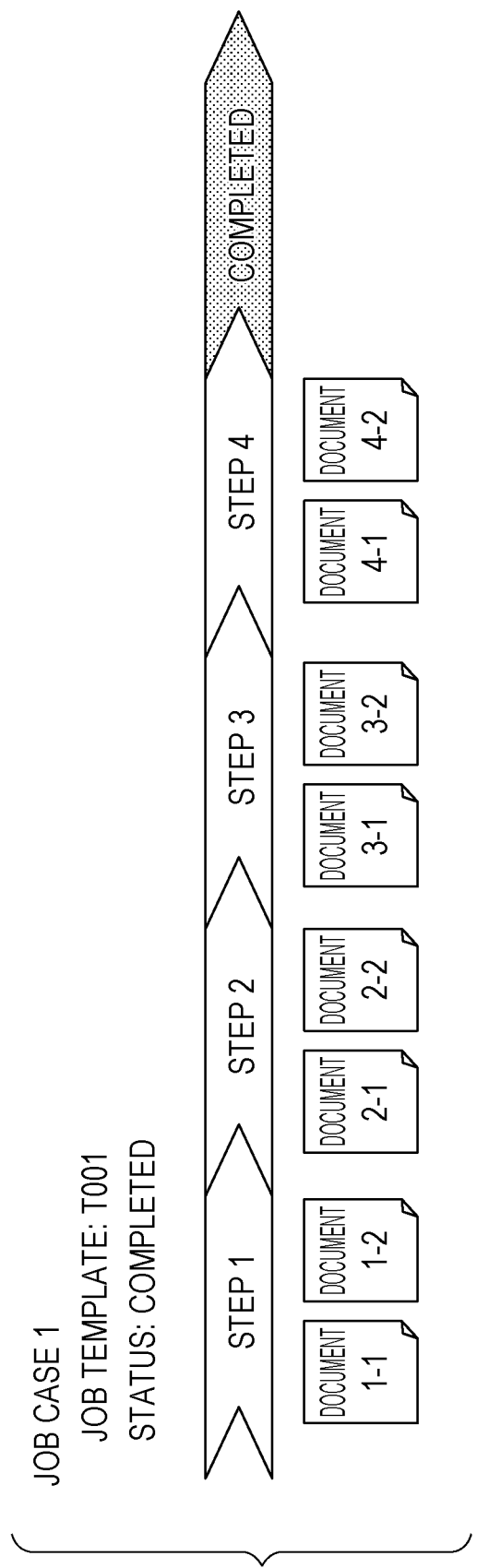
FIG. 3A schematically illustrates the status of job case 1 in the first exemplary embodiment.
Figure 3B:
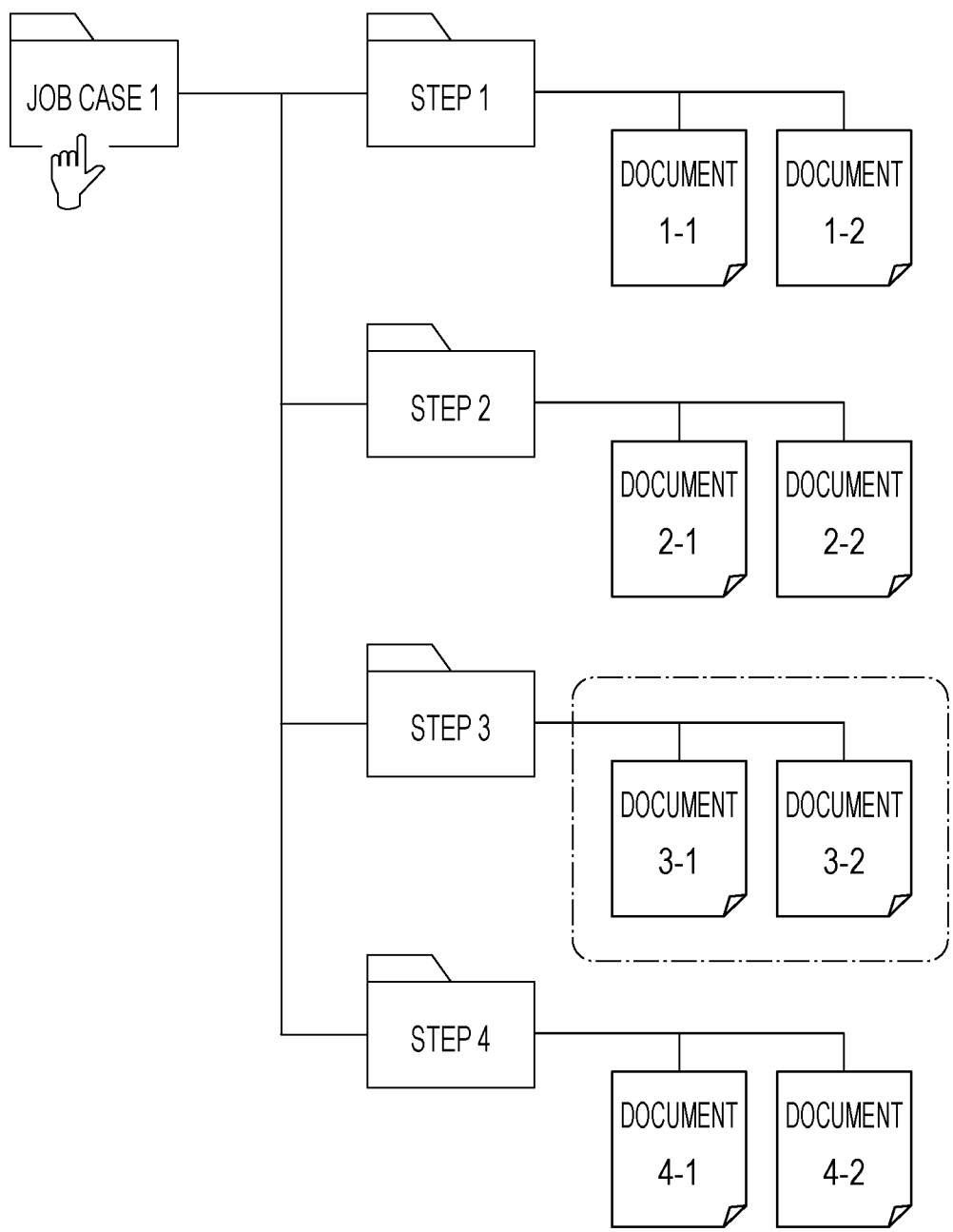
FIG. 3B illustrates the configuration of folders and documents created in accordance with job case 1 in the first exemplary embodiment.

FIG. 3A illustrates the status of job case 1 drafted based on a job template "T001". FIG. 3A shows that the job template "T001" defines a job process consisting of step 1 through step 4 and that two documents are to be created in each of step 1 through step 4. In FIG. 3A, in the job process, "completed" is highlighted in gray, which indicates that step 1 through step 4 are all finished and case 1 has been completed.

FIG. 3B illustrates the configuration of folders and documents created in accordance with job case 1. As shown in FIG. 3B, the folders of job case 1 are formed in the following hierarchical structure. Under the parent folder of job case 1, child folders corresponding to step 1 through step 4 are created. In the child folder in each step, documents created in a corresponding step are stored. Job case 1 has been completed, and all the documents created in the individual steps are stored in the corresponding folders.

FIG. 3C illustrates the status of job case 2 drafted based on the job template "T001". FIG. 3C shows that, since job case 2 is drafted based on the same template "T001" as for job case 1, the job process consisting of step 1 through step 4 are already defined and that two documents are to be created in each of step 1 through step 4. In FIG. 3C, "step 3" is highlighted in gray, which indicates that step 3 is currently executed.

Figure 3D:
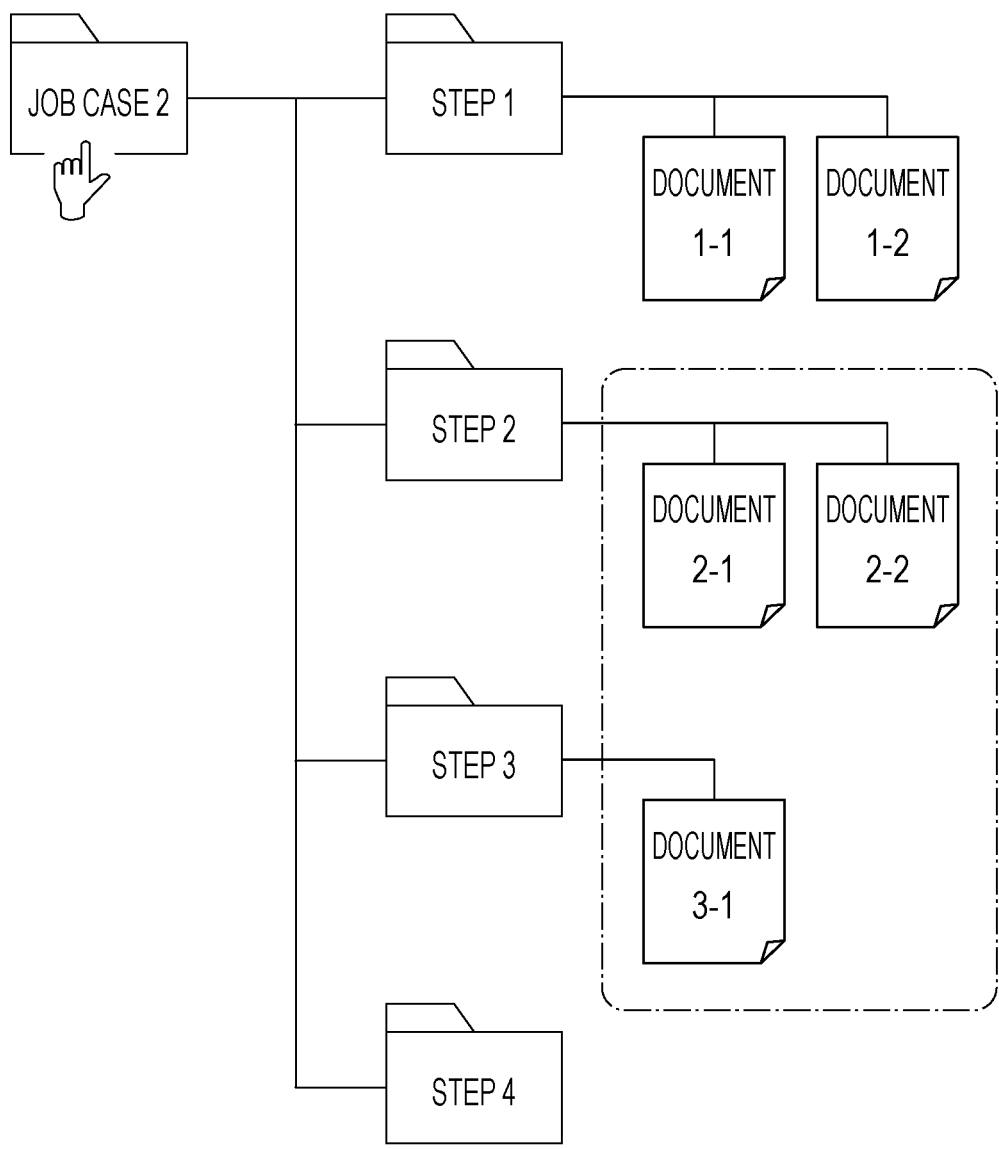
FIG. 3D illustrates the configuration of folders and documents created in accordance with job case 2 in the first exemplary embodiment.

FIG. 3D illustrates the configuration of folders and documents created in accordance with job case 2. As shown in FIG. 3D, the folders of job case 2 are formed in the following hierarchical structure. Under the parent folder of job case 2, child folders corresponding to step 1 through step 4 are created. In the child folder in each step, documents created in a corresponding step are stored. In job case 2, documents in step 1 and step 2, which are completed steps, and document 3-1 in step 3, which is the ongoing step, have been created, but document 3-2 in step 3 and documents in step 4 are not yet created.

Display processing in the first exemplary embodiment will be discussed below with reference to the flowchart of FIG. 4. Display processing will be explained when a job is in the status shown in FIGS. 3A and 3B and when a job is in the status shown in FIGS. 3C and 3D. In the following description, "user" is the user using the client PC 5 unless otherwise stated.

The user first performs a predetermined operation, such as starting a document management application to search for a document to be checked. The operation receiver 111 of the display control device 1 receives this operation. The display controller 112 then performs control to display the hierarchical structure of folders stored in the document repository 31 on the client PC 5. The user then selects a folder storing a target document from among the folders displayed on the client PC 5. It is assumed that the user has selected the folder with a mouseover operation.

In response to receiving the user selecting operation by the operation receiver 111 of the display control device 1, the job management information obtainer 12 identifies the folder selected by the user as a subject folder in step S101. Then, in step S102, the job management information obtainer 12 checks whether the subject folder is a folder linked with a job case. The job management information indicates the name of the parent folder of each job case. The job management information obtainer 12 can thus easily judge whether the folder selected by the user is a folder linked with a job case. If the selected folder is a folder linked with a job case (YES in step S102), the job management information obtainer 12 checks the progress of the subject job by referring to the job management information. More specifically, the job management information obtainer 12 judges in step S103 whether the job case has been completed.

It is now assumed that the user has selected the folder positioned on the highest level of the hierarchical structure of job case 1, that is, the parent folder of job case 1 (hereinafter simply called the folder of job case 1). The status of job case 1 shown in FIG. 3A indicates that job case 1 has been completed (the result of step S103 is YES). In step S104, the job management information obtainer 12 searches for an ongoing job case which is being carried out based on the same template as that for job case 1 and identifies which step of this ongoing job case is currently executed. It is assumed that job case 2 shown in FIG. 3C is found as the ongoing job case. The job management information obtainer 12 then obtains the job management information concerning job case 1 and job case 2.

In step S105, the document selector 13 refers to the job management information obtained by the job management information obtainer 12 and selects documents to be displayed. That is, in this example, in job case 2, step 3 is currently executed, and the document selector 13 thus selects documents in step 3 of job case 1, which is the selected job case, namely, document 3-1 and document 3-2 surrounded by the long dashed dotted lines in FIG. 3B, from the document repository 31.

Since the user has selected the folder of job case 1, document 1-1, document 1-2, document 2-1, . . . , document 4-2 could be displayed. The document selector 13, however, assumes that the user may wish to check document 3-1 and document 3-2 in step 3, based on the fact that step 3 in job case 2, which is the ongoing job case, is now being executed. The document selector 13 accordingly selects document 3-1 and document 3-2 from among the documents of job case 1.

In step S106, the thumbnail generator 141 generates thumbnails of the selected documents. In step S107, the display controller 112 performs control to display display information including the generated thumbnails on the screen of the client PC 5.

As described above, in the first exemplary embodiment, if job case 1 linked with the folder selected by the user with a mouseover operation has been completed, the status of another job case (that is, job case 2) which is being carried out based on the same job template as job case 1 is checked. Then, the step number of job case 2 which is currently executed is detected, and document 3-1 and document 3-2 in step 3 of job case 1 are selected.

If step 4 of job case 2 is currently executed, the document selector 13 selects document 4-1 and document 4-2 in step 4 of job case 1. In this manner, depending on the status of job case 2 at the time when the user has selected the folder of job case 1 with a mouseover operation, documents to be displayed become different.

As described above, according to the first exemplary embodiment, in response to a user selecting a folder icon with a mouse, documents that the user probably wishes to check are selected and displayed from among the documents of the selected folder. This enables the user to easily find a target document from among the displayed documents. Additionally, as a result of selecting and displaying only suitable documents, the space for displaying document thumbnails is reduced.

In the first exemplary embodiment, thumbnails of documents are displayed. Instead of thumbnails, attribute information for identifying documents, such as document names, may be displayed.

In step S104, a job case using the same template as that job case 1 (job case 2 in the above-described example) is found. If multiple ongoing job cases using the same template as job case 1 are found, documents in the same step number of job case 1 as the ongoing step of each of the searched job cases may be displayed. Alternatively, documents to be displayed may be narrowed down based on another condition, as will be discussed in another exemplary embodiment. For example, documents to be displayed are restricted to documents whose creator or approver is a user performing a mouseover operation.

A description will now be given of display processing to be executed when the user selects the folder positioned on the highest level of the hierarchical structure of job case 2, that is, the parent folder of job case 2 (hereinafter simply called the folder of job case 2). The status of job case 2 shown in FIG. 3C shows that job case 2 is currently in progress and step 3 is being executed. The result of step S103 accordingly becomes NO. The job management information obtainer 12 then proceeds to step S108. The job management information obtainer 12 identifies that step 3 is now being executed and then obtains the job management information concerning job case 2. The document selector 13 refers to the obtained job management information and selects at least one of a group of documents created in step 3, which is the ongoing step, and a document created in step 2, which is the step immediately before step 3, from among the documents in the folders of job case 2 (including child folders on the lower levels). If both of the documents in the current step and those in the previous step are selected in the first exemplary embodiment, the document selector 13 selects document 2-1, document 2-2, and document 3-1 surrounded by the long dashed dotted lines in FIG. 3D, from the document repository 31.

Then, in step S106, the thumbnail generator 141 generates thumbnails of the selected documents, as discussed above. In step S107, the display controller 112 performs control to display display information including the generated thumbnails on the screen of the client PC 5.

Based on the fact that the user has selected the folder of job case 2, which is the ongoing job case, it can be assumed that the user wishes to check lately created documents. Thus, in the first exemplary embodiment, when a user has selected a folder (job case 2, for example) with a mouseover operation to display documents, the display control device 1 assumes that the user wishes to check lately created documents in the selected folder and performs control to display such documents on the client PC 5.

In the first exemplary embodiment, when a document is created or approved, "Yes" is set in the job management information. Alternatively, the date on which a document is created or approved may be set.

If the folder selected by the user is not a folder linked with a job case (the result of step S102 is NO), documents are specified in accordance with a predetermined rule and are obtained from the document repository 31 in step S109. In the flowchart of FIG. 4, it is assumed that, as a result of checking access history information (not shown), downloaded documents are obtained. Then, in step S106, the thumbnail generator 141 generates thumbnails of the obtained documents. In step S107, the display controller 112 performs control to display display information including the generated thumbnails on the screen of the client PC 5.

As described above, in the first exemplary embodiment, even when the user has selected the same folder with a mouseover operation, documents to be displayed are different depending on the status of the ongoing job case (job case 2 in the above-described example).

Figure 5:
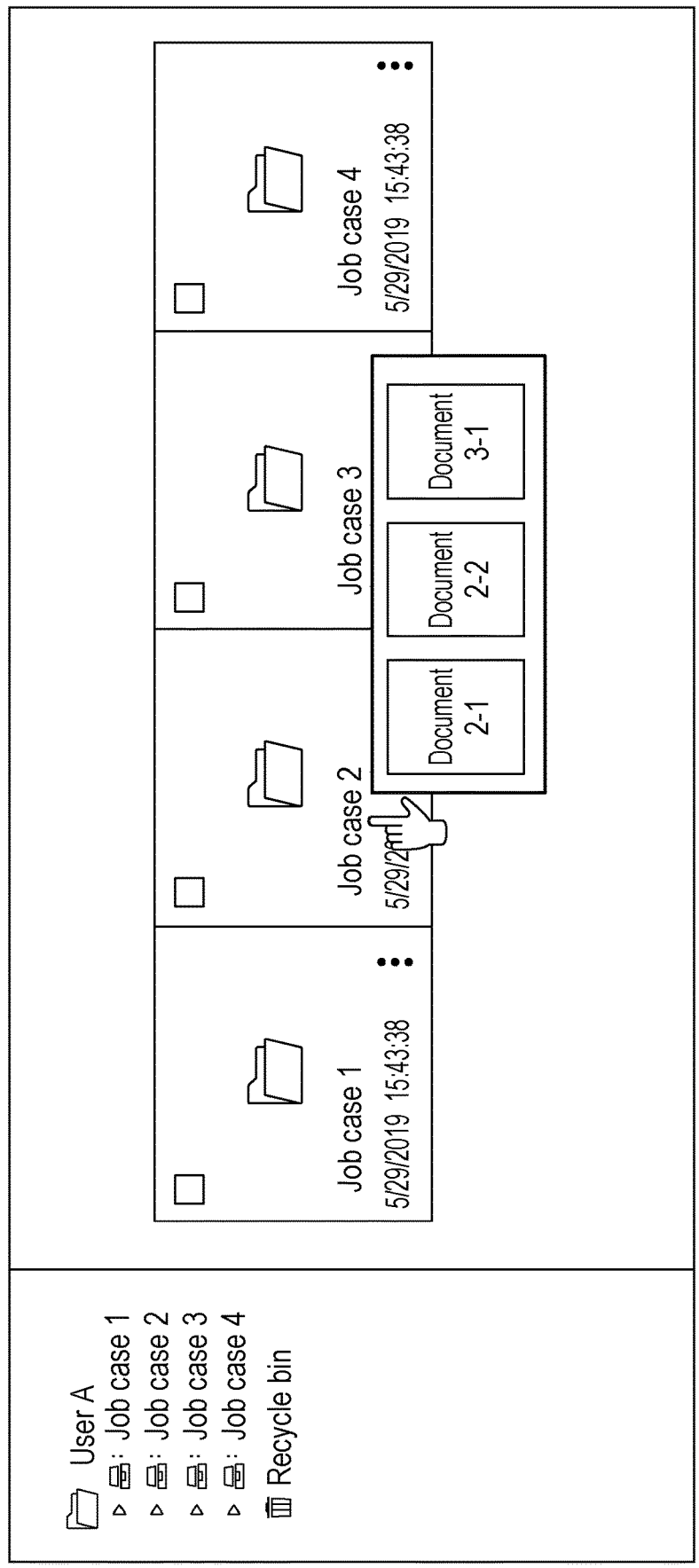
FIG. 5 illustrates an example of the display screen of a client personal computer (PC)

FIG. 5 illustrates an example of the display screen of the client PC 5. In FIG. 5, the folders of job case 1 through job case 4, which are the lower level of the folder "UserA", are displayed, and the user has set the mouse pointer over the folder of job case 2. As indicated by this display example, the user merely selects the folder of job case 2 with a mouse without opening the folder and can check which documents are stored in the folder (documents selected by the document selector 13) in a tooltip or popup window. This helps the user figure out in which folder a target document is included.

Second Exemplary Embodiment

Figure 4:
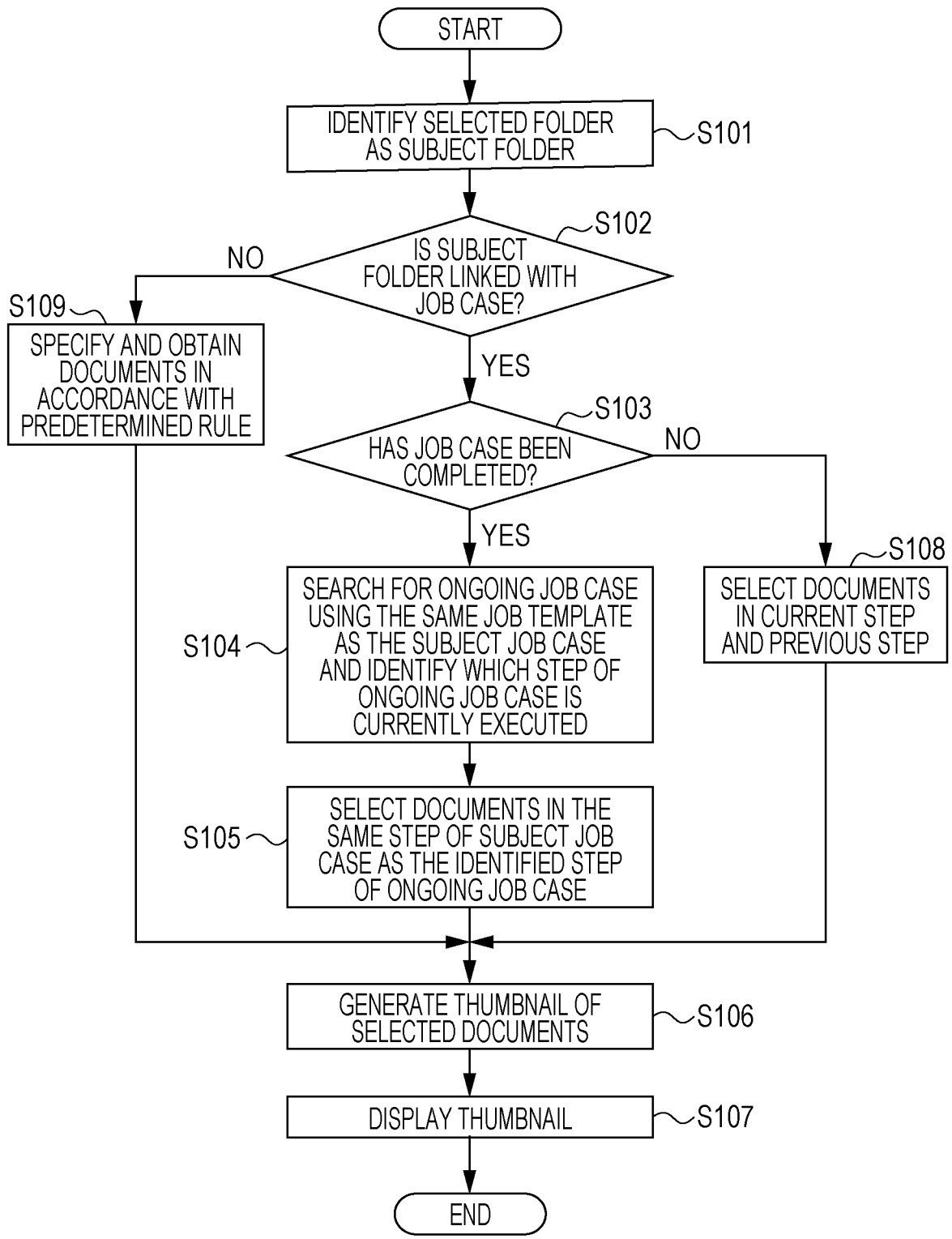
FIG. 4 is a flowchart illustrating display processing according to the first exemplary embodiment.

In a second exemplary embodiment, the configurations of a file management system and job management information are the same as those shown in FIGS. 1 and 2, and display processing is the same as that shown in FIG. 4. In the second exemplary embodiment, a user selecting a folder icon with a mouse is identified so that the documents selected in step S105 or S108 in FIG. 4 become different from those in the first exemplary embodiment. In other words, even with the same status of a job selected by a user and even with the same operation performed by the user, documents to be displayed become different depending on who has performed the mouseover operation. Processing for selecting and obtaining documents will be explained below with reference to FIGS. 6A through 6D.

Figure 6B:
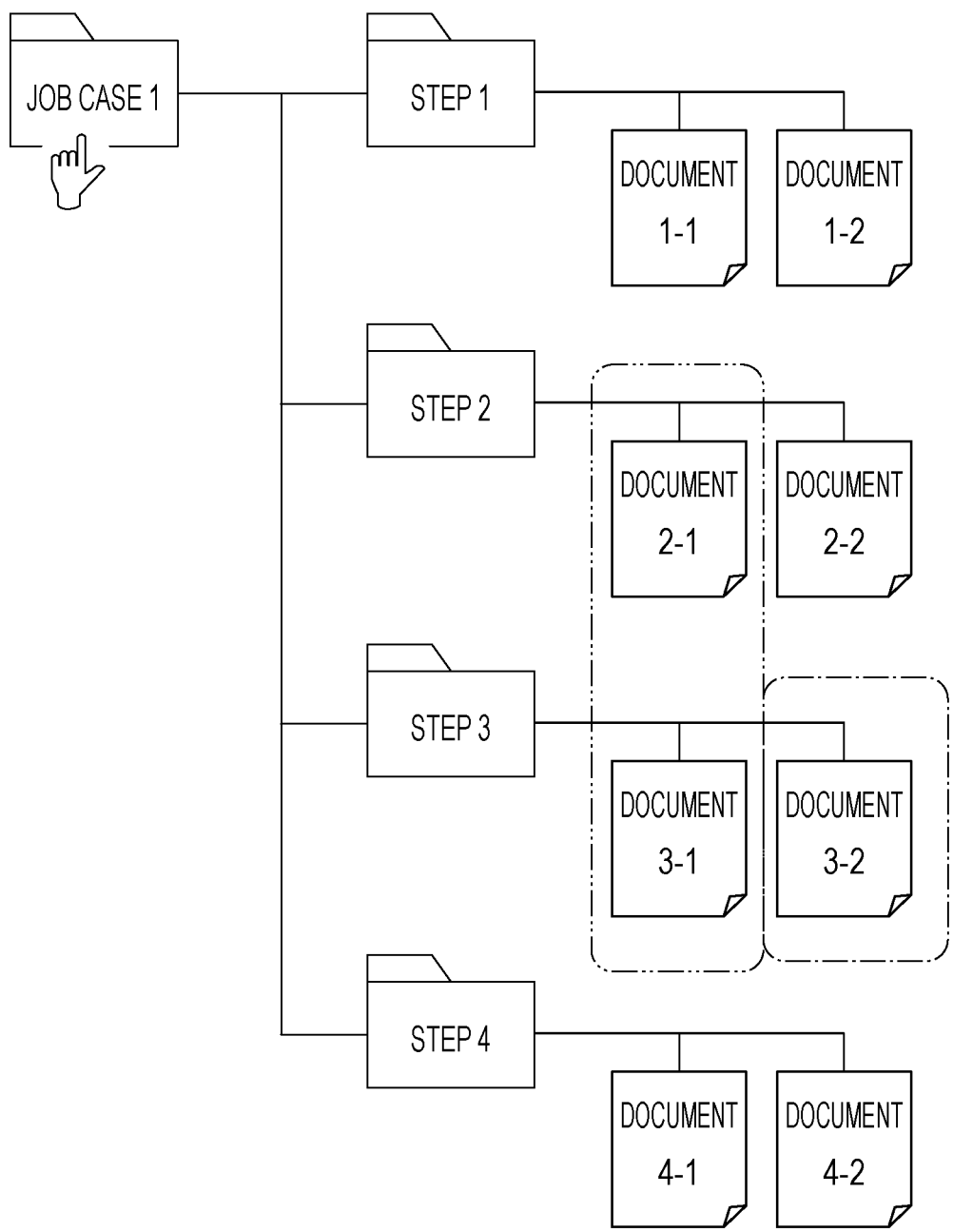
FIG. 6B illustrates the configuration of folders and documents created in accordance with job case 1 in the second exemplary embodiment.
Figure 6C:
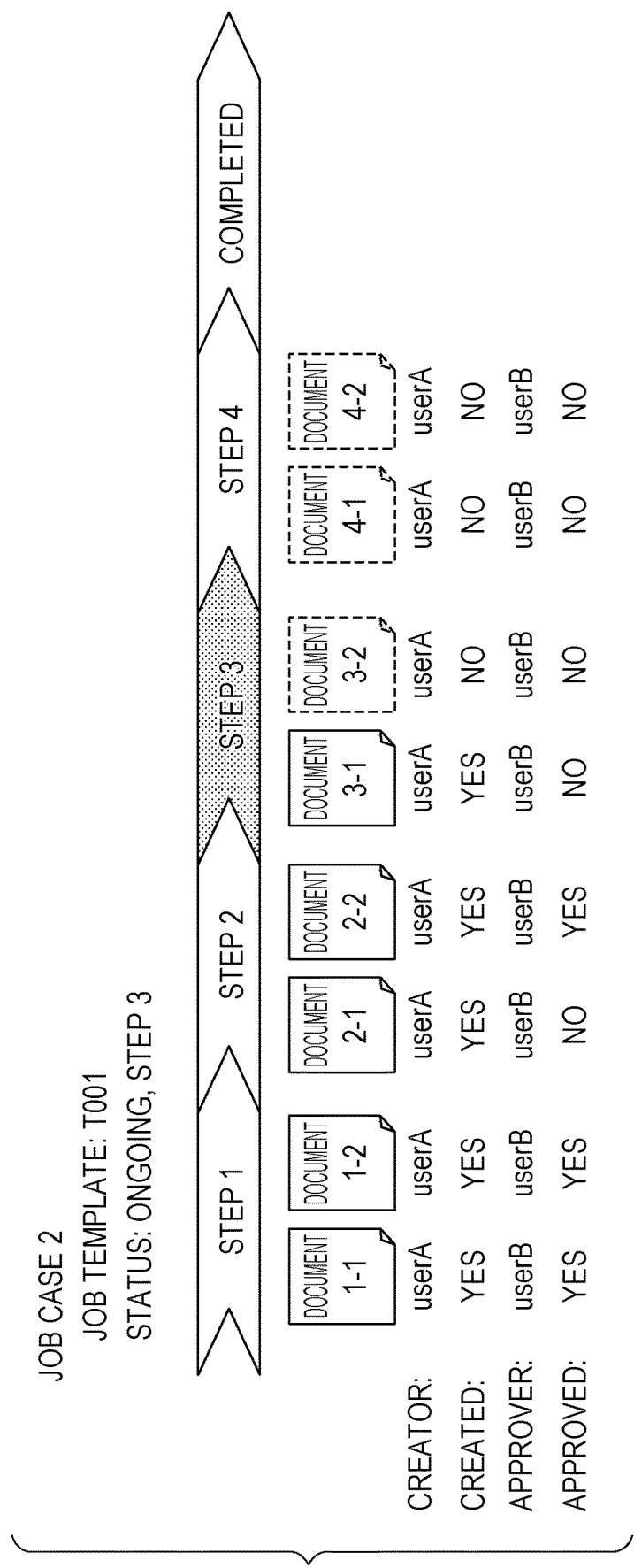
FIG. 6C schematically illustrates the status of job case 2 in the second exemplary embodiment.
Figure 6D:
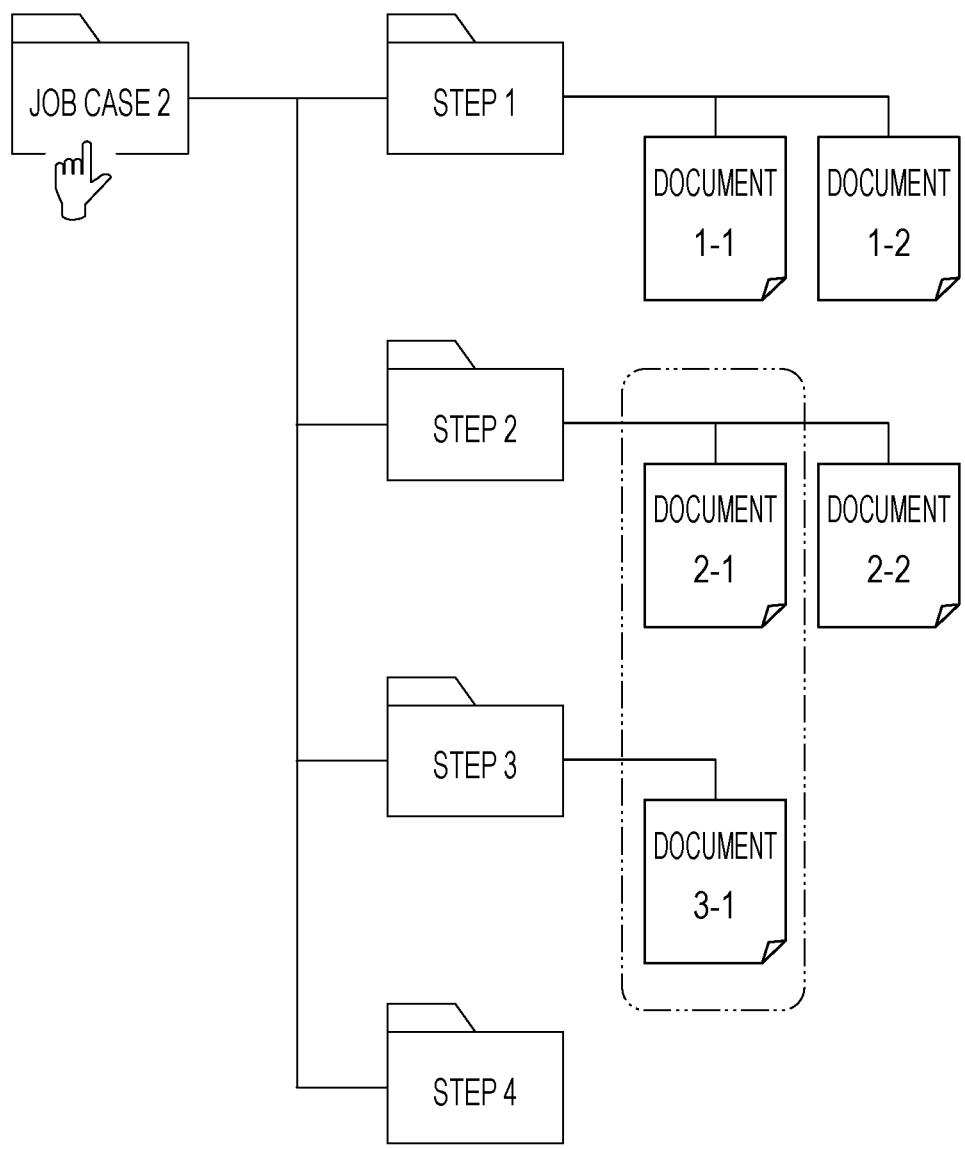
FIG. 6D illustrates the configuration of folders and documents created in accordance with job case 2 in the second exemplary embodiment.

The progress status of job case 1 and the documents created in the individual steps are the same as those in FIGS. 3A and 3B, while the progress status of job case 2 and the documents created in the individual steps are the same as those in FIGS. 3C and 3D. In the second exemplary embodiment, however, as shown in FIG. 6C, regarding job case 2, which is an ongoing job case, the creator and the approver of each document, and the creation status and the approval status of each document, that is, information indicating whether each document has been created or approved, are checked.

The user performing a mouseover operation (hereinafter simply called the operating user) is assumed to be a user A represented by identification information "userA". The operating user can be identified with reference to login information, for example. As shown in FIG. 6C, the job management information indicates that the user A is the creator of all the documents of job case 2. The user A is accordingly the creator of document 3-1 and document 3-2 in the ongoing step 3 of job case 2. The user A has created document 3-1 but has not yet created document 3-2.

It is now assumed that the user A has selected the folder of job case 1 with a mouseover operation. In this case, as discussed in the first exemplary embodiment, the ongoing step 3 of job case 2 using the same job template "T001" as job case 1 is specified. In step 3 of job case 2, the user A has created document 3-1 but has not yet created document 3-2. That is, it can be assumed that the user A wishes to create document 3-2 of job case 2 by referring to document 3-2 of job case 1, which is already created. The document selector 13 thus selects document 3-2 of job case 1, which is the same document type as document 3-2 of job case 2, as indicated by the long dashed dotted lines in FIG. 6B, and obtains document 3-2 of job case 1 from the document repository 31.

When the user A has selected the folder of job case 2, documents are selected and displayed similarly to the first exemplary embodiment, and an explanation thereof will be omitted.

The operating user is assumed to be a user B represented by identification information "userB". As shown in FIG. 6C, the job management information indicates that the user B is the approver of all the documents of job case 2. Among the created documents of job case 2, the user B has not yet approved document 2-1 in step 2, which is the previous step of the current step 3, and document 3-1 and document 3-2 in the current step 3. Document 3-2 has not been created yet, as discussed above. That is, the user B has document 2-1 and document 3-1 to be approved.

It is now assumed that the user B has selected the folder of job case 1 with a mouseover operation. In this case, as discussed above, the current step 3 of job case 2 created based on the same job template "T001" as job case 1 is specified. In job case 2, the user B has not yet approved document 2-1 and document 3-1 among the created documents. That is, it can be assumed that the user B wishes to do approval work for document 2-1 and document 3-1 of job case 2 by referring to document 2-1 and document 3-1 of job case 1, which have already been created. The document selector 13 thus selects document 2-1 and document 3-1 of job case 1, which are the same document types as document 2-1 and document 3-1 of job case 2, as indicated by the long dashed double-dotted lines in FIG. 6B, and obtains these documents from the document repository 31.

When the user B has selected the folder of job case 2, it can be assumed that the user B wishes to do approval work for a document in job case 2. The document selector 13 thus selects document 2-1 and document 3-1 that have been created but has not been approved yet and obtains these documents from the document repository 31.

As described above, in the second exemplary embodiment, even with the same status of a job selected by a user and even with the same operation performed by the user, documents to be checked may become different depending on the operating user. That is, the documents to be displayed can be varied depending on the user.

Third Exemplary Embodiment

In the first exemplary embodiment, when the folder of job case 1, which is a completed job case, is selected, the ongoing step of an ongoing job case using the same job template as job case 1 (step 3 of job case 2 in the above-described example) is specified, and then, documents in the same step of job case 1 as the specified step are selected as the documents to be displayed.

In a third exemplary embodiment, documents to be displayed are selected similarly to the first exemplary embodiment, but a document related to the selected documents is also selected and displayed.

Figure 7B:
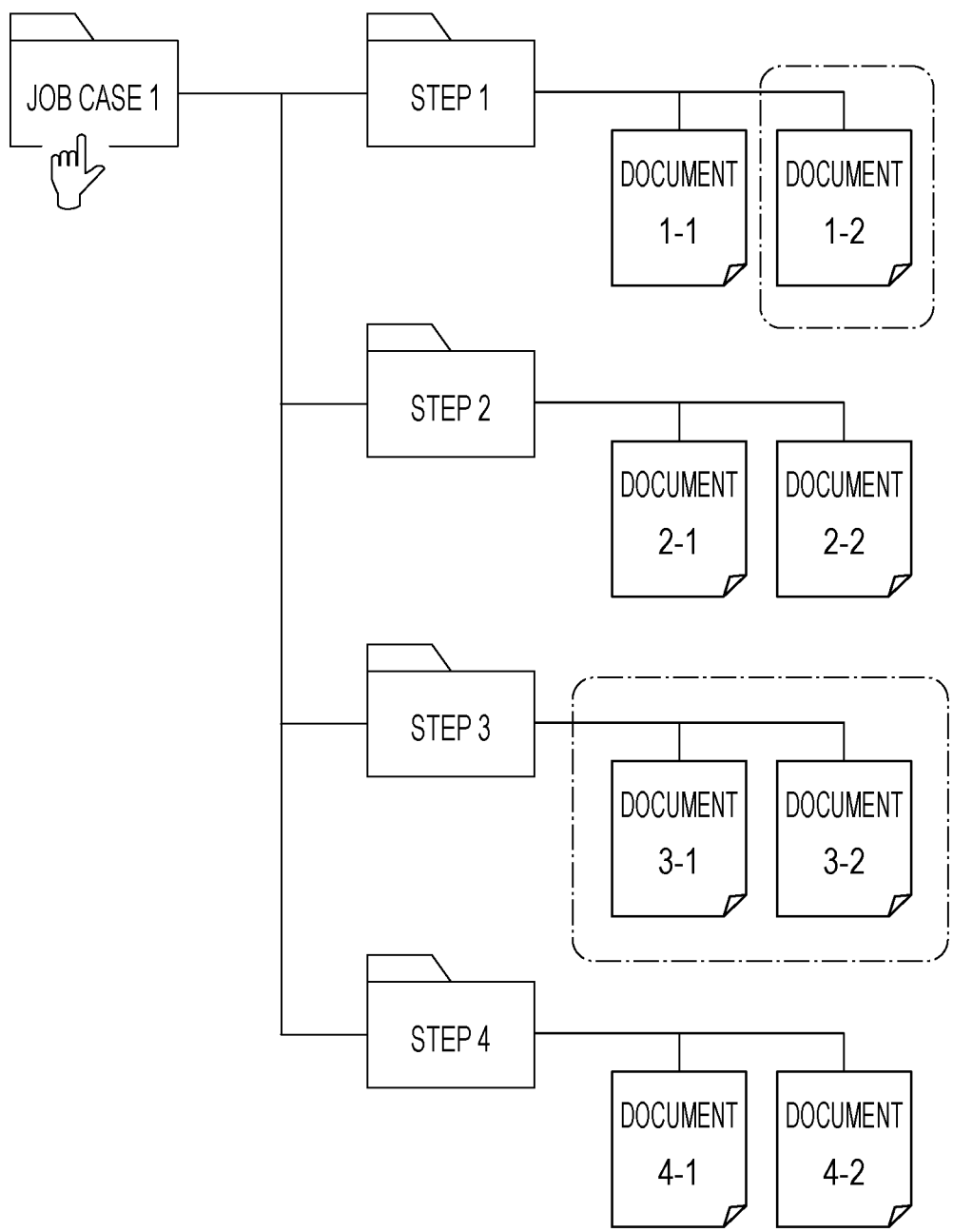
FIG. 7B illustrates the configuration of folders and documents created in accordance with job case 1 in the third exemplary embodiment.
Figure 7C:
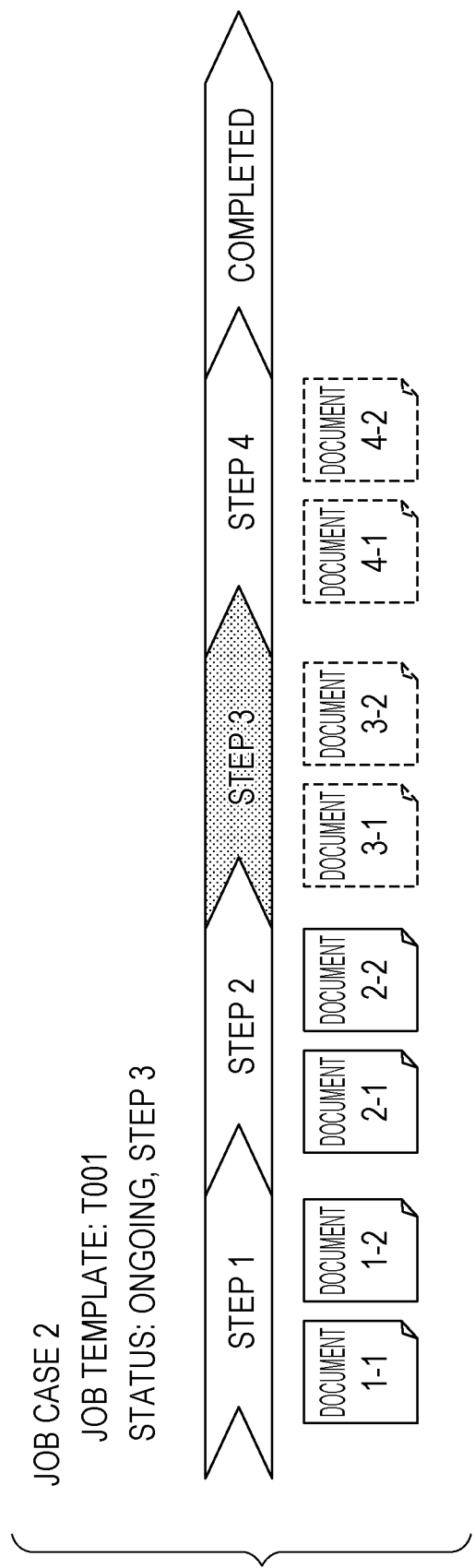
FIG. 7C schematically illustrates the status of job case 2 in the third exemplary embodiment.

FIG. 7A illustrates the progress status of job case 1, while FIG. 7C illustrates the progress status of job case 2. The progress statuses in FIGS. 7A and 7C are the same as those in FIGS. 3A and 3C in the first exemplary embodiment. FIG. 7B shows that, in response to a user having selected the folder of job case 1 with a mouseover operation, the document selector 13 selects document 3-1 and document 3-2 after processing is executed similarly to the first exemplary embodiment. FIG. 7B also shows that the document selector 13 has selected document 1-2 related to at least one of document 3-1 and document 3-2.

To find a related document, the degree of relevance between documents is calculated in accordance with a predetermined rule, for example. In the third exemplary embodiment, the degree of relevance between each document of job case 1 and each of document 3-1 and document 3-2 is calculated. Then, the calculated degree of relevance is compared with a predetermined threshold. A document having a degree of relevance greater than or equal to the predetermined threshold (document 1-2 in this example) is selected. The degree of relevance is calculated by using a known technique. For example, if the creator and/or the approver of a document are the same creator and/or the same approver of document 3-1 or 3-2, for example, or if a document includes more words identical to those in document 3-1 or 3-2, for example, the degree of relevance of such a document becomes greater. The degree of relevance may be calculated based on attribute information concerning a document, such as the registration date of the document in the document repository 31, the updating date of the document, the number of times the document is downloaded or accessed, the number of times the document is output from the document repository 31, and the relationship between the department of the creator of this document and that of another document. For example, if the creator of one document and that of another document belong to the same department, the degree of relevance becomes greater.

Figure 7D:
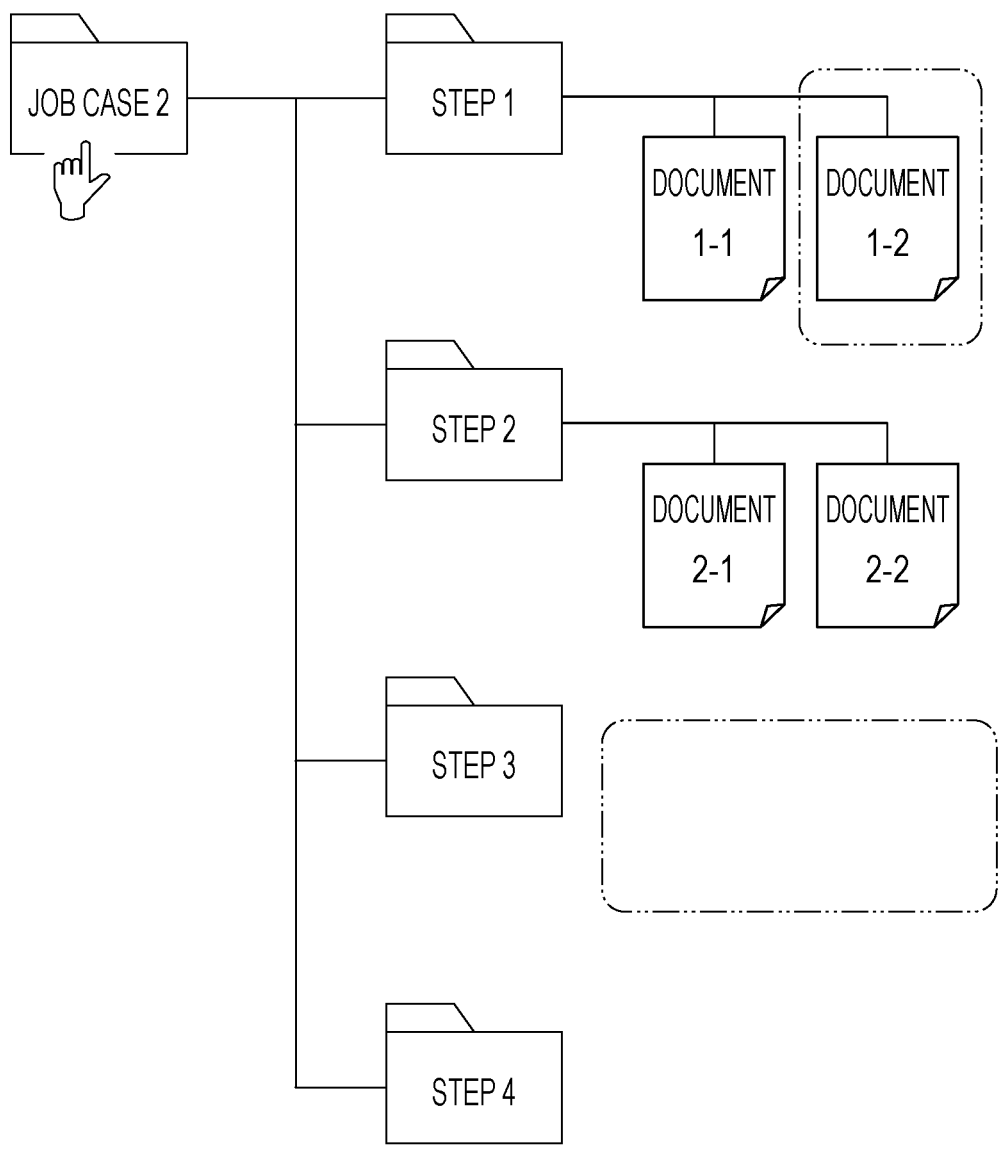
FIG. 7D illustrates the configuration of folders and documents created in accordance with job case 2 in the third exemplary embodiment.

When the user has selected the folder of job case 2, which is an ongoing job case, with a mouseover operation, the document selector 13 selects a document related to documents created in step 3, which is the ongoing step. If document 3-1 and document 3-2 in step 3 to be displayed are not yet created, as shown in FIG. 7D, the document selector 13 does not select them but still selects a document (document 1-2 in this example) related to document 3-1 and document 3-2 (to-be-created documents). Approaches to selecting relevant documents are similar to those described above.

Fourth Exemplary Embodiment

In the first through third exemplary embodiments, when a user has selected a folder with a mouseover operation, documents to be displayed are selected and thumbnails of the selected documents are displayed on the screen of the client PC 5 as a display element indicating the documents. In a fourth exemplary embodiment, the thumbnail generator 141 generates a thumbnail in accordance with the user having performed a mouseover operation or the document selected to be displayed.

Typically, a thumbnail is generated by reducing the size of the first page of a document, such as the cover page of a document. In the fourth exemplary embodiment, the thumbnail generator 141 generates a thumbnail from the image of a page related to job steps or a page describing the features of a document.

For example, a document selected by the document selector 13 is assumed to be a document A including an order sheet. If the document A is not yet approved and if the operating user is the approver of the document A, the thumbnail generator 141 generates a thumbnail of the document A from the image of the page to be checked by the approver to approve the document A, such as the image of a page showing a list of order goods.

If step 2, which is subsequent to step 1 in which the document A is created, is currently in progress and if the operating user is the creator of a document in step 2, the thumbnail generator 141 generates a thumbnail of the document A from the image of a page which may be useful for creating a document in step 2, such as the image of the page showing the table of contents of the document A. In the third exemplary embodiment, regarding job case 1, the document selector 13 has selected document 1-2 as a document related to document 3-1. In this case, in the fourth exemplary embodiment, the thumbnail generator 141 analyzes document 1-2 to specify a page related to document 3-1, and then generates a thumbnail of document 1-2 from the image of the specified page. If document 1-2 is related to document 3-2, the thumbnail generator 141 analyzes document 1-2 to specify a page related to document 3-2, and then generates a thumbnail of document 1-2 from the image of the specified page. A relevant page can be specified using a known technology, such as calculating of the word frequency in the document or conducting natural language analysis.

If a document is a thesis, a thumbnail is generated from the image of a page describing the general statement or the abstract. If a document is an invoice, a thumbnail is generated from the image of a page indicating the total amount. If a document is a delivery statement, a thumbnail is generated from a page including information concerning a delivery destination.

A thumbnail may not necessarily represent the image of the entire page. Only part of a page, such as a portion of a page indicating the total amount of an invoice or a portion of a page including information concerning a delivery destination of a delivery statement, may be used to generate a thumbnail.

As discussed above, in the fourth exemplary embodiment, it is possible to generate a thumbnail from a suitable page or a suitable portion of a page in accordance with the operating user or the type of document.

In the above-described exemplary embodiments, in response to a user performing a mouseover operation, a display element, that is, thumbnails in the above-described exemplary embodiments, indicating files stored in a folder are displayed. However, the operation for displaying a display element is not restricted to a mouseover operation.

Figure 8:
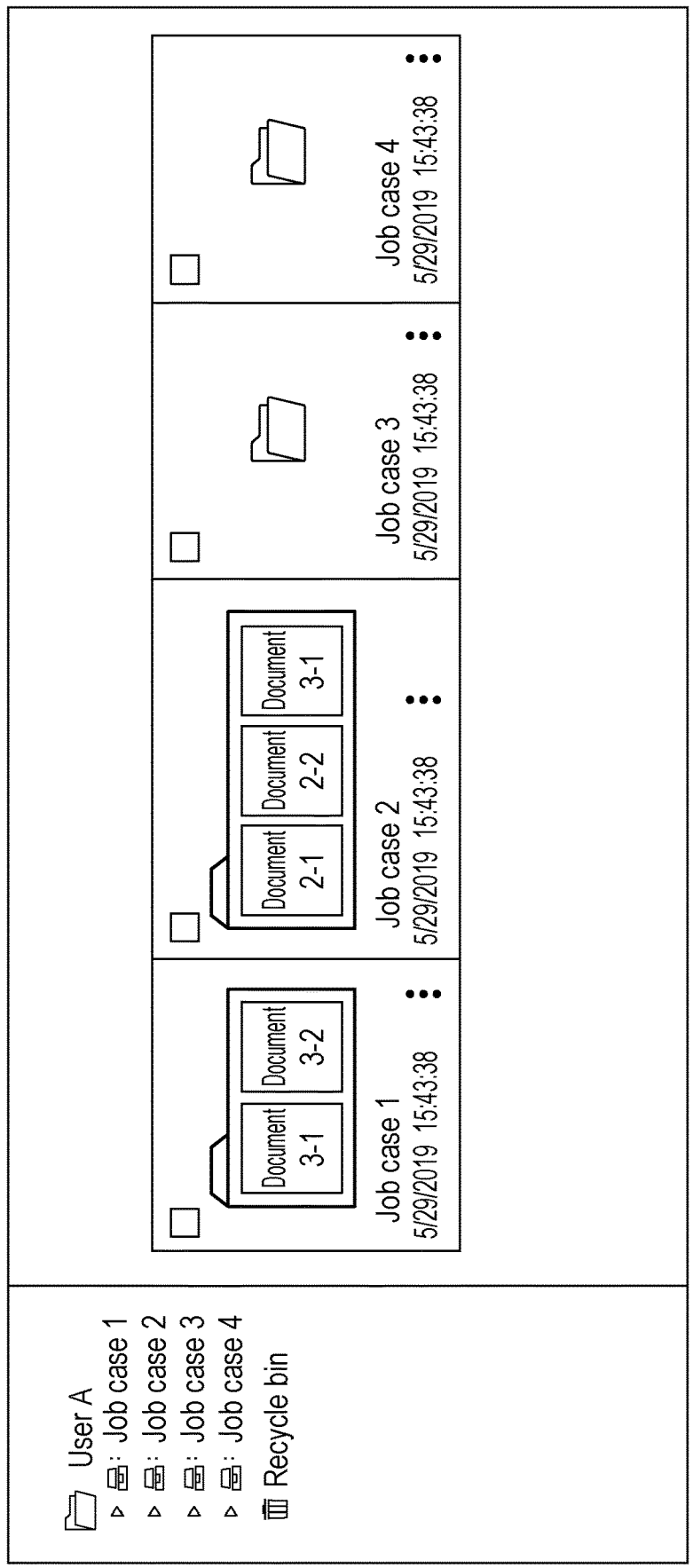
FIG. 8 illustrates another example of the display screen of the client PC.

FIG. 8 illustrates another example of the display screen of the client PC 5. In FIG. 8, the folders of job case 1 through job case 4, which are the lower level of the folder "UserA", are displayed. Folder icons are formed and displayed so that thumbnails of all or some of the documents stored in each folder are displayed. In FIG. 8, the thumbnails of the folder of job case 1 and those of job case 2 are displayed by way of example. In the example in FIG. 8, a user can check which documents (documents selected by the document selector 13, as described above) are included in a folder without opening the folder or performing a mouseover or click operation, for example. This helps the user figure out in which folder a target document is included. As shown in the example in FIG. 8, the operation for displaying a display element is not limited to an operation intentionally performed by a user to display a display element, such as a mouseover operation. Even without such an intentional operation, documents selected with a function of any of the exemplary embodiments may be displayed. In other words, in response to starting an application, a display element is displayed. Hence, an operation for starting an application and an operation for selecting a folder positioned at the highest level, that is, an operation for displaying a list of folders, are examples of an operation for displaying a display element. As a result of performing such an operation, folders are displayed, and thus, such an operation may be regarded as an operation for selecting a folder.

The above-described exemplary embodiments have been discussed by assuming that a parent folder is selected by a mouseover operation. The exemplary embodiments are also applicable to a case in which a child folder corresponding to a step is selected. In this case, processing is executed similarly to that when a parent folder is selected. When a child folder is selected, documents to be displayed are selected from among documents stored in the child folder and those stored in folders on a lower level of the child folder.

The above-described exemplary embodiments have been discussed by assuming that the order of steps, that is, the order of tasks, in a job is fixed. The exemplary embodiments are also applicable to a case in which the order of tasks is not fixed.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus which is able to access a file storage region of a first memory, the file storage region being formed in accordance with job defining information that defines tasks of a job and a file to be created in each of the tasks, the file storage region being formed for each job or each job and each task, a file related to a job or a task being stored in a corresponding file storage region, the information processing apparatus comprising:
a processor configured to
obtain, from a second memory, job status information concerning a status of each job for which a file storage region is formed; and
in response to an operation for displaying a display element indicating files stored in a first file storage region,
select a stored file as a subject file to be displayed, from among the files stored in the first file storage region, in accordance with the status of a first job corresponding to the first file storage region, the status of the first job being obtained from the job status information, and
cause information indicating the subject file to be displayed on a display, wherein
the processor is further configured to
if the first job corresponding to the first file storage region has been completed, select the subject file to be displayed from among the files stored in the first file storage region by referring to a status of a second job to be conducted based on the same job defining information used for the first job, and
also select, as a file to be displayed, a file different from the subject file to be displayed, from among the files stored in the first file storage region, the selected file having a degree of relevance greater than or equal to a predetermined value, the degree of relevance of the selected file indicating how much the selected file is relevant to the subject file to be displayed.

2. The information processing apparatus according to claim 1, wherein the processor is configured to:
select, as the subject file to be displayed, a file created in the same task of the first job as an ongoing task of the second job, from among the files stored in the first file storage region.

3. The information processing apparatus according to claim 1, wherein the processor is configured to:
select the subject file to be displayed from among the files stored in the first file storage region by referring to the status of a file to be created in the second job.

4. The information processing apparatus according to claim 3, wherein the processor is configured to:
select, as the subject file to be displayed, from among the files stored in the first file storage region, a file of the same type as a file to be created or approved by a user in an ongoing task of the second job, the user being a user having performed the operation for displaying the display element indicating the files stored in the first file storage region.

5. The information processing apparatus according to claim 1, wherein the processor is configured to:
if the first job corresponding to the first file storage region is currently in progress,
select, as the subject file to be displayed, at least one of a file created in an ongoing task of the first job and a file created in a task immediately before the ongoing task, from among the files stored in the first file storage region.

6. The information processing apparatus according to claim 5, wherein the processor is configured to:
select, as the subject file to be displayed, a file to be approved by a user in the first job from among the files stored in the first file storage region, the user being a user having performed the operation for displaying the display element indicating the files stored in the first file storage region.

7. The information processing apparatus according to claim 1, wherein the processor is configured to:
perform control to display a display element corresponding to a file selected as the subject file to be displayed.

8. The information processing apparatus according to claim 7, wherein the processor is configured to:
generate the display element in accordance with a user having performed the operation or the file selected as the subject file to be displayed.

9. An information processing apparatus which is able to access a file storage region of a first memory, the file storage region being formed in accordance with job defining information that defines tasks of a job and a file to be created in each of the tasks, the file storage region being formed for each job or each job and each task, a file related to a job or a task being stored in a corresponding file storage region, the information processing apparatus comprising:
a processor configured to
obtain, from a second memory, job status information concerning a status of each job for which a file storage region is formed; and
in response to an operation for displaying a display element indicating files stored in a first file storage region,
select a stored file as a subject file to be displayed, from among the files stored in the first file storage region, in accordance with the status of a first job corresponding to the first file storage region, the status of the first job being obtained from the job status information, and
cause information indicating the subject file to be displayed on a display, wherein
the processor is further configured to:
if the first job corresponding to the first file storage region is currently in progress, select, as the subject file to be displayed, at least one of a file created in an ongoing task of the first job and a file created in a task immediately before the ongoing task, from among the files stored in the first file storage region, and
also select, as a file to be displayed, a file different from the subject file to be displayed, from among the files stored in the first file storage region, the selected file having a degree of relevance greater than or equal to a predetermined value, the degree of relevance of the selected file indicating how much the selected file is relevant to the subject file to be displayed.

10. An information processing apparatus which is able to access a file storage region of a first memory, the file storage region being formed in accordance with job defining information that defines tasks of a job and a file to be created in each of the tasks, the file storage region being formed for each job or each job and each task, a file related to a job or a task being stored in a corresponding file storage region, the information processing apparatus comprising:
a processor configured to
obtain, from a second memory, job status information concerning a status of each job for which a file storage region is formed; and
in response to an operation for displaying a display element indicating files stored in a first file storage region,
select a stored file as a subject file to be displayed, from among the files stored in the first file storage region, in accordance with the status of a first job corresponding to the first file storage region, the status of the first job being obtained from the job status information, and
cause information indicating the subject file to be displayed on a display, wherein
the processor is further configured to:
if the first job corresponding to the first file storage region is currently in progress, select, as the subject file to be displayed, at least one of a file created in an ongoing task of the first job and a file created in a task immediately before the ongoing task, from among the files stored in the first file storage region, and
even when the file to be created in the ongoing task of the first job is not yet created, select a file as a file to be displayed, from among the files stored in the first file storage region, the selected file having a degree of relevance greater than or equal to a predetermined value, the degree of relevance of the selected file indicating how much the selected file is relevant to the file to be created in the ongoing task of the first job.

11. A non-transitory computer readable medium storing a program causing a computer to execute a process, the process comprising:
obtaining, from a second memory, job status information concerning a status of each job for which a file storage region of a first memory is formed, the file storage region being formed in accordance with job defining information that defines tasks of a job and a file to be created in each of the tasks, the file storage region being formed for each job or each job and each task, a file related to a job or a task being stored in a corresponding file storage region;
in response to an operation for displaying a display element indicating files stored in a first file storage region,
selecting a stored file as a subject file to be displayed, from among the files stored in the first file storage region, in accordance with the status of a first job corresponding to the first file storage region, the status of the first job being obtained from the job status information, and
causing information indicating the subject file to be displayed on a display;
if the first job corresponding to the first file storage region has been completed, selecting the subject file to be displayed from among the files stored in the first file storage region by referring to a status of a second job to be conducted based on the same job defining information used for the first job; and
selecting, as a file to be displayed, a file different from the subject file to be displayed, from among the files stored in the first file storage region, the selected file having a degree of relevance greater than or equal to a predetermined value, the degree of relevance of the selected file indicating how much the selected file is relevant to the subject file to be displayed.

12. An information processing apparatus which is able to access a file storage region of a first memory, the file storage region being formed in accordance with job defining information that defines tasks of a job and a file to be created in each of the tasks, the file storage region being formed for each job or each job and each task, a file related to a job or a task being stored in a corresponding file storage region, the information processing apparatus comprising:

means for obtaining, from a second memory, job status information concerning a status of each job for which a file storage region is formed;

means for selecting,
- in response to an operation for displaying a display element indicating files stored in a first file storage region, a stored file as a subject file to be displayed, from among the files stored in the first file storage region, in accordance with the status of a first job corresponding to the first file storage region, the status of the first job being obtained from the job status information, and
- as a file to be displayed, a file different from the subject file to be displayed, from among the files stored in the first file storage region, the selected file having a degree of relevance greater than or equal to a predetermined value, the degree of relevance of the selected file indicating how much the selected file is relevant to the subject file to be displayed;

means for selecting, if the first job corresponding to the first file storage region has been completed, the subject file to be displayed from among the files stored in the first file storage region by referring to a status of a second job to be conducted based on the same job defining information used for the first job; and means for causing, in response to the operation for displaying the display element indicating files stored in the first file storage region, information indicating the subject file to be displayed on a display.

* * * * *